Aug. 17, 1954
L. B. BURGIN
2,686,891
STATIC ELECTRICITY GROUNDING DEVICE FOR VEHICLES
Filed Sept. 25, 1952
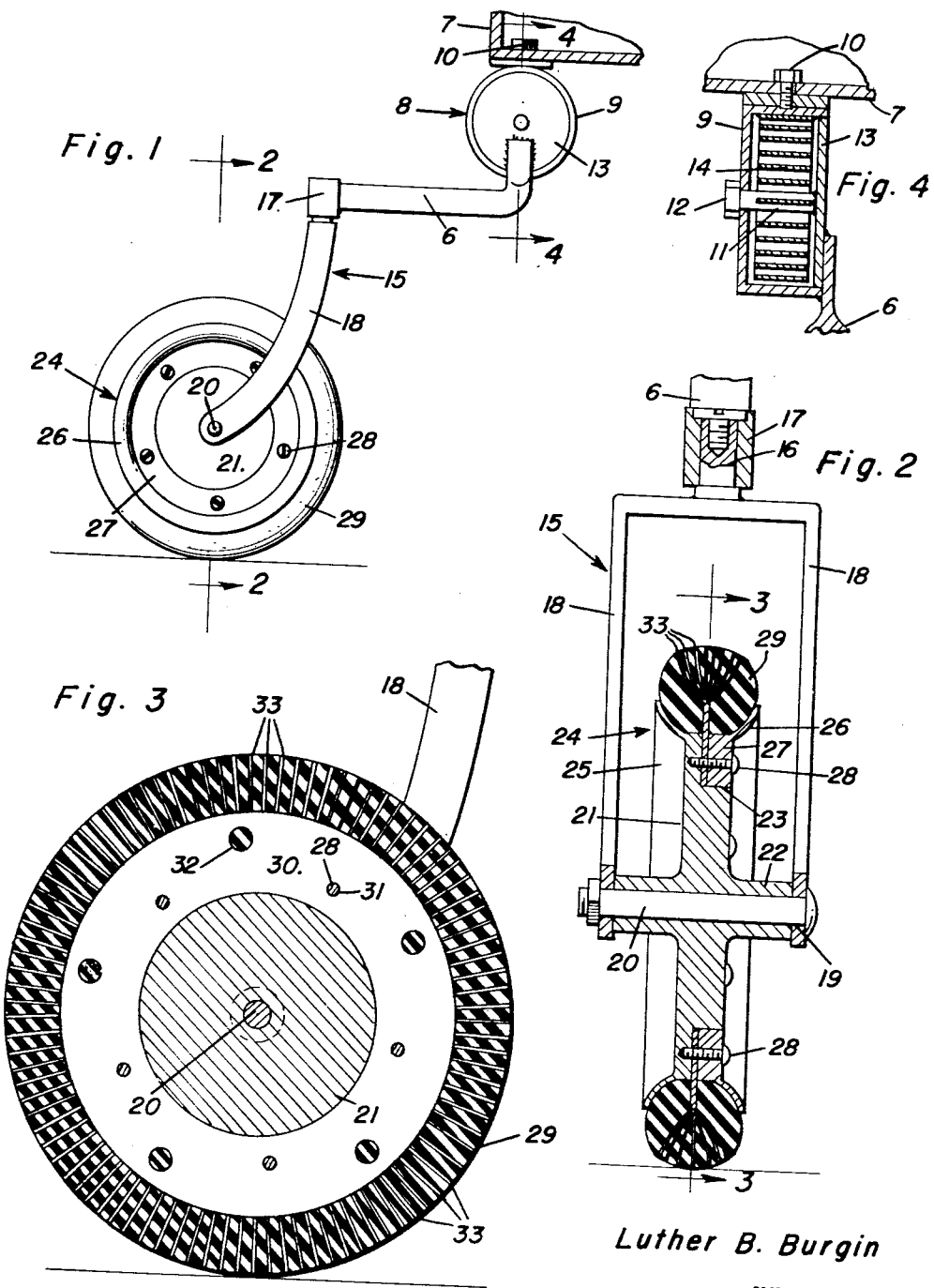
Luther B. Burgin
INVENTOR.

Patented Aug. 17, 1954

2,686,891

UNITED STATES PATENT OFFICE 2,686,891

STATIC ELECTRICITY GROUNDING DEVICE FOR VEHICLES

Luther B. Burgin, Poplar Bluff, Mo.

Application September 25, 1952, Serial No. 311,449

1 Claim. (Cl. 317—2)

The present invention relates to new and useful improvements in ground wheels for motor vehicles, particularly tank trucks and trailers and has for its primary object to provide, in a manner as hereinafter set forth, novel means for ridding such vehicles of the static electricity which is usually generated therein.

Another very important object of the invention is to provide novel means for mounting the device beneath the vehicle, whereby the wheel may roll over rough or uneven surfaces without being damaged thereby.

Other objects of the invention are to provide a static electricity grounding wheel for motor vehicles which will be comparatively simple in construction, strong, durable, reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation of a static electricity grounding wheel constructed in accordance with the present invention.

Figure 2 is a cross-sectional view taken substantially on the line 2—2 of Figure 1.

Figure 3 is a longitudinal sectional view through the wheel, taken substantially on the line 3—3 of Figure 2.

Figure 4 is a cross-sectional view taken substantially on the line 4—4 of Figure 1.

Referring now to the drawing in detail, it will be seen that the embodiment of the invention which has been illustrated comprises an angular mounting arm or bracket 6 of suitable metal. The arm 6 is mounted for swinging movement in a vertical plane beneath the frame 7 of the vehicle through the medium of a hinge 8.

The hinge 8 includes a substantially cup-shaped housing 9 (see Figure 4) which is firmly secured beneath the frame 7 of the vehicle by means including a cap screw 10. Rotatably mounted in the housing 9 is a shaft 11 having threaded on one end portion thereof a retaining nut 12. Fixed on the other end of the shaft 11 and rotatable in the open end portion of the housing 9 is a disc 13. One end portion of the arm 6 is fixed on the disc 13. Mounted in the housing 9 is a coil spring 14 having one end fixed to the shaft 11 and its other end fixed to the housing. The spring 14 yieldingly urges the shaft 13 in a direction to swing the arm 6 downwardly.

Swivelly mounted on the free end of the arm 6 is a fork 15. The fork 15 includes, on its bight portion, an upstanding shaft 16 which is journaled in a bearing 17 provided therefor on the arm 6.

The free end portions of the legs 18 of the fork 15 have openings 19 therein for the reception of an axle 20. A metallic ground wheel 21 is journaled on the axle 20. The wheel 21 includes a hub 22 which receives the axle 20.

As illustrated to advantage in Figure 2 of the drawing the wheel 21 includes a peripheral rabbet 23. Mounted on the wheel 21 is a rim 24. The rim 24, which is circumferentially divided, comprises a stationary inner section 25, which is integral with the wheel 21. The rim 24 further includes a removable outer section 26 which is integral with a ring 27. The ring 27 is engageable in the recess 23 and is secured to the wheel 21 through the medium of bolts 28.

Removably mounted on the rim 24 is a cushion tire 29 of suitable material. Molded in the inner portion of the tire 29 and extending inwardly therefrom is a metallic ring 30. The ring 30 is engaged between the ring 27 and the opposed outer portion of the wheel 21 and said ring is apertured, as at 31, to accommodate the bolts 28. The ring 30 is further provided at spaced points with relatively large openings 32 within the tire 29 for strengthening the bond between said tire and said ring.

Also embedded or molded in the tire 29 is a multiplicity of conductor wires 33. The conductor wires 33 are electrically connected in any suitable manner to the ring 30 and extend therefrom to the tread surface of the tire 29.

It is thought that the operation of the device will be readily apparent from a consideration of the foregoing. Briefly, any static electricity generated in the vehicle is conducted therefrom through the hinge 8, arm 6, the fork 15, the axle 20, the wheel 21, the ring 30, and the wires 33 to the ground. The wheel swivels on the arm 6 in the manner of a caster. The spring 14 permits the wheel to rise and fall when rolling over irregularities but maintains said wheel in constant contact with the ground. The tire 29 with the ring 30 may be expeditiously removed from the wheel 21 for replacement or for any other purpose, by removing the ring 27 with the integral rim section 26.

It is believed that the many advantages of a static electricity grounding wheel constructed in accordance with the present invention will be readily understood, and although a preferred embodiment of the device is as illustrated and described, it is to be understood that changes in the details of construction may be resorted to which will fall within the scope of the invention as claimed.

Having described the invention, what is claimed as new is:

A static electricity grounding device of the character described comprising a metallic wheel, said wheel having a peripheral rabbet therein, a rim on the wheel, said rim including an inner section integral with the wheel and further including a removable outer section comprising an integral ring engaged in the rabbet, a cushion tire mounted on the ring, a substantially flat ring embedded in the tire and extending inwardly therefrom between the first named ring and the opposed portion of the wheel, bolts securing the first and second named rings to the wheel and a multiplicity of conductor wires embedded in the tire and electrically connected to the second named ring, said wires extending from said second named ring to the tread of said tire.

References Cited in the file of this patent

UNITED STATES PATENTS

| Number | Name | Date |
|---|---|---|
| 1,067,361 | Midgley | July 15, 1913 |
| 1,636,483 | Nielsen | July 19, 1927 |
| 2,125,378 | Kadas | Aug. 2, 1938 |
| 2,216,363 | Crawford | Oct. 1, 1940 |
| 2,280,327 | Ware | Apr. 21, 1942 |
| 2,526,980 | Selhost | Oct. 24, 1950 |